United States Patent
Léchot et al.

(10) Patent No.: US 6,689,138 B2
(45) Date of Patent: Feb. 10, 2004

(54) TORQUE-TRANSMITTING COUPLING

(75) Inventors: André Léchot, Orvin (CH); Patrick M. White, Downingtown, PA (US); Pierre-David Bourgeois, Bôle (CH); Ezzedine Mahmoud, Route d'Aergeten (CH)

(73) Assignee: Precimed S.A., Orvin (CH)

( * ) Notice: Subject to any disclaimer, the term of this patent is extended or adjusted under 35 U.S.C. 154(b) by 0 days.

(21) Appl. No.: 10/059,232

(22) Filed: Jan. 31, 2002

(65) Prior Publication Data
US 2002/0171208 A1 Nov. 21, 2002

Related U.S. Application Data

(63) Continuation-in-part of application No. 10/043,423, filed on Jan. 10, 2002.
(60) Provisional application No. 60/338,718, filed on Nov. 6, 2001, and provisional application No. 60/262,362, filed on Jan. 19, 2001.

(51) Int. Cl.[7] .............................................. A61B 17/16
(52) U.S. Cl. ...................................................... 606/80
(58) Field of Search ............................. 606/79, 80, 87, 606/96, 43.2; 279/103, 102, 2.02, 2.1, 2.11, 2.12, 158; 403/347, 225, 367, 368, 297

(56) References Cited

U.S. PATENT DOCUMENTS

| | | | | |
|---|---|---|---|---|
| 680,497 A | * | 8/1901 | Mueller | 279/102 |
| 2,644,929 A | * | 7/1953 | Kumpf | 333/263 |
| 4,632,195 A | * | 12/1986 | Emmerich | 175/320 |
| 5,720,749 A | * | 2/1998 | Rupp | 606/79 |
| 2002/0063399 A1 | * | 5/2002 | Rohm | 279/2.02 |
| 2002/0128658 A1 | * | 9/2002 | White | 606/80 |

\* cited by examiner

Primary Examiner—Michael J. Milano
Assistant Examiner—D. Jacob Davis
(74) Attorney, Agent, or Firm—Bugnion S.A.; John Moetteli

(57) ABSTRACT

According to the invention, a torque-transmitting assembly is described. A female coupling member defines a shape with a tapered bore. A radially flexible sleeve member has a wall with a tapered exterior surface, received within the bore, and an inner surface defining a through-bore. An elongated shaft member made of super-elastic alloy has an outer surface that is received within the through-bore. Relative motion among at least two of the members causes the inner surface to contact the outer surface, inducing a super-elastic activation in the shaft, simultaneously securing the members together in a fixed relative position. The radially flexible sleeve member has a plurality of collet fingers, which preferably contact the shaft at discrete locations. It is further preferred that the super-elastic activation in the shaft occurs as a result of the discrete contact thereby changing the cross-sectional shape of the shaft, which is generally non-circular, e.g., polygonal, in a further preferred form. A surgical device, e.g., a flexible reamer, is descibed as incorporating the present assembly.

23 Claims, 7 Drawing Sheets

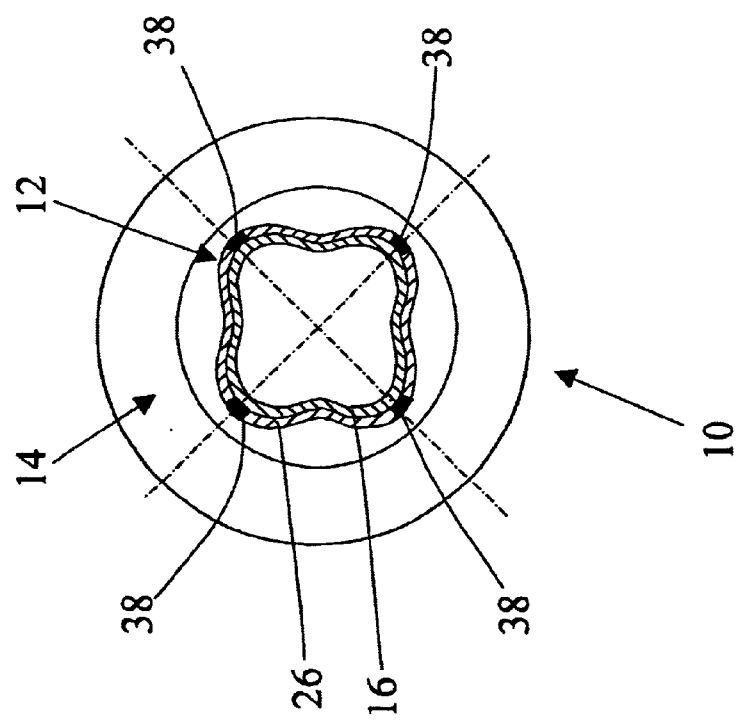
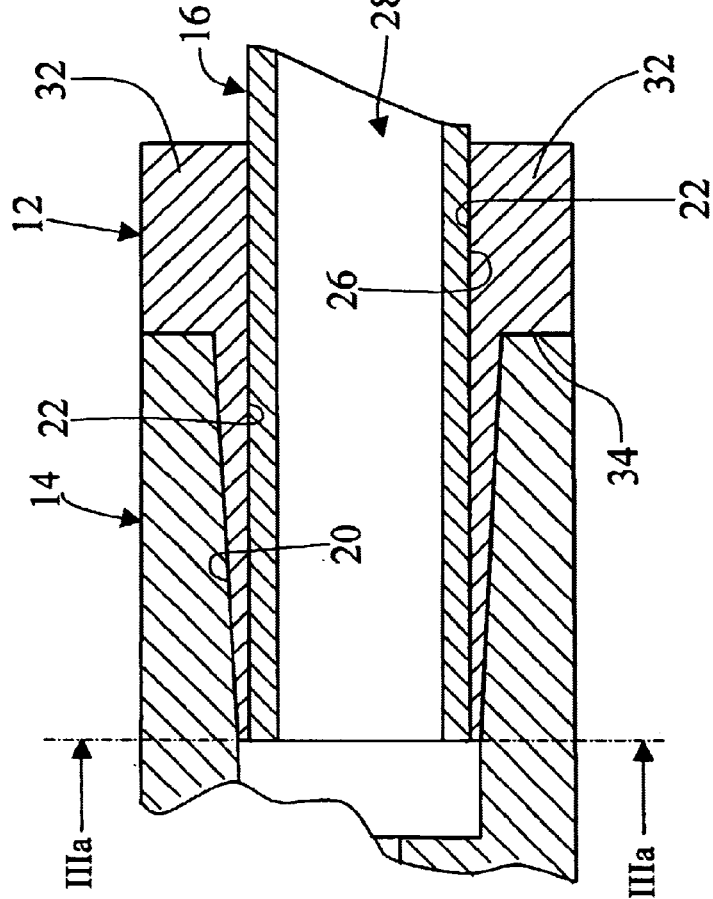

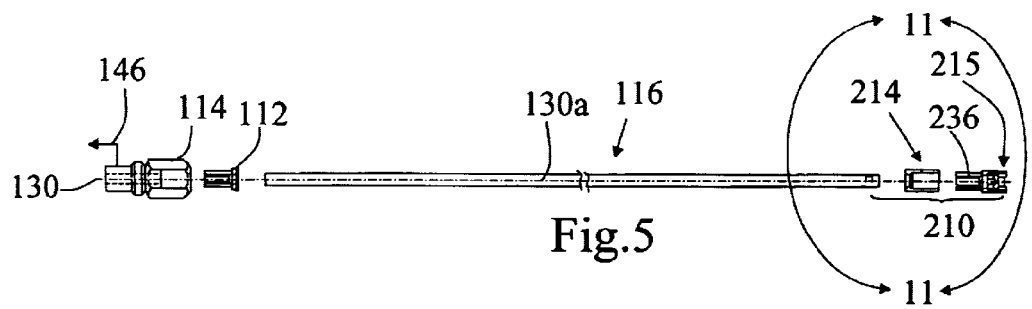
Fig.5
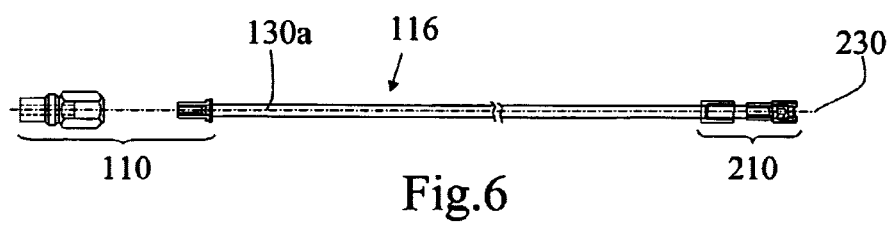
Fig.6
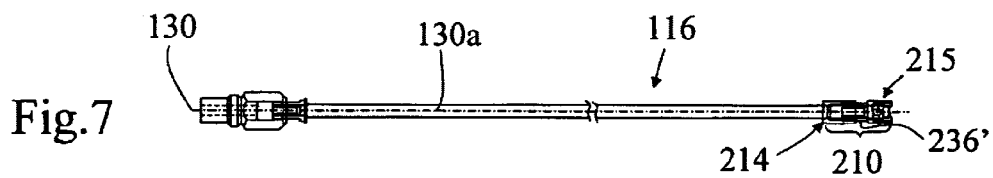
Fig.7
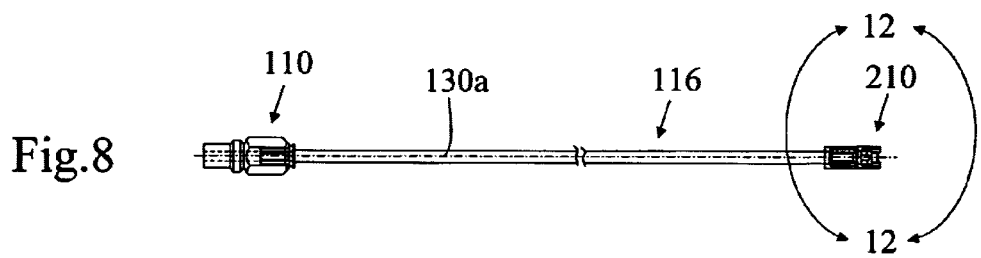
Fig.8
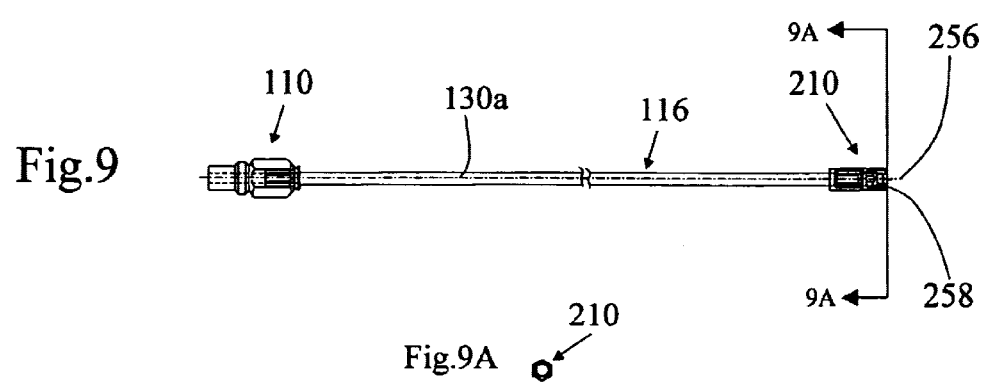
Fig.9
Fig.9A

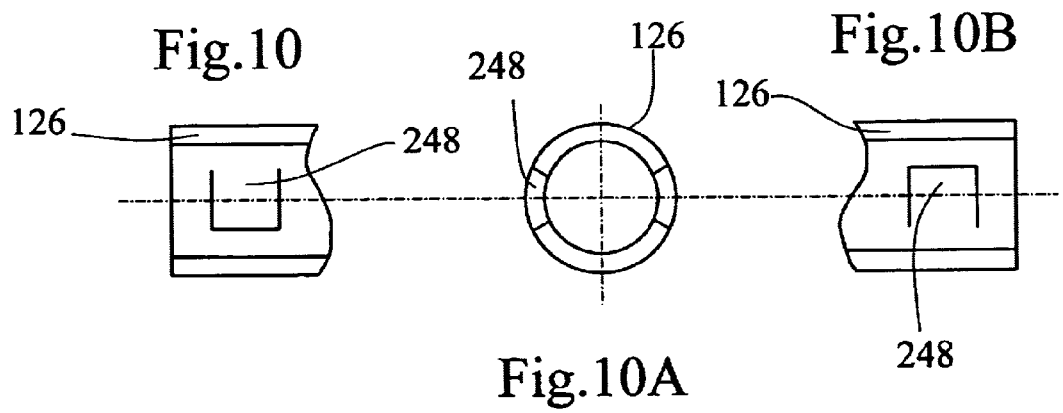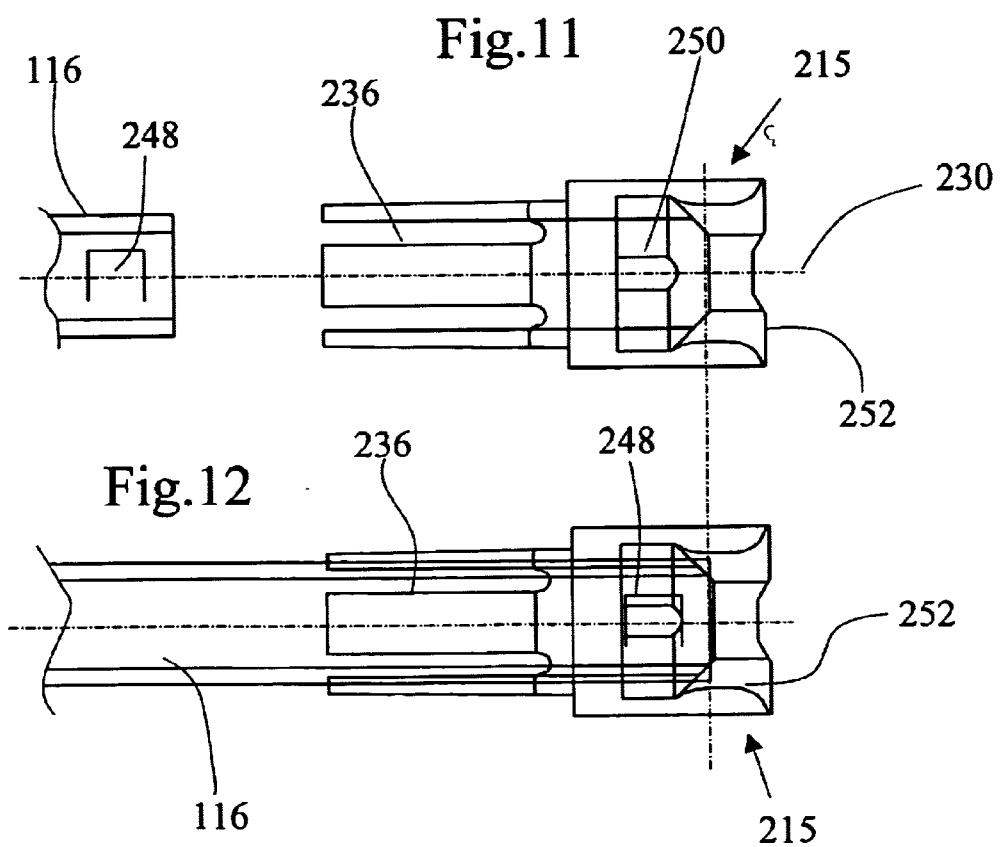

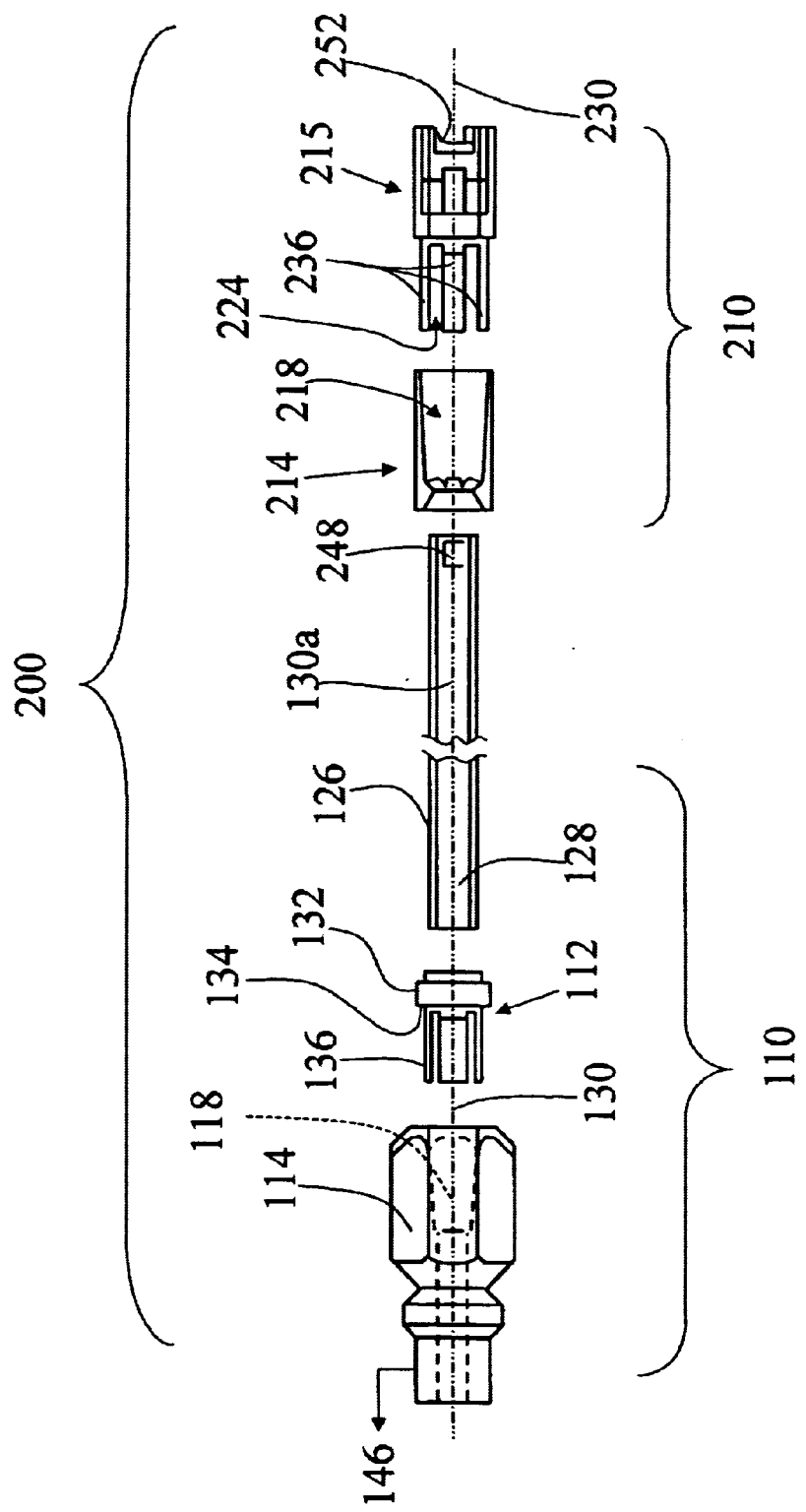

TORQUE-TRANSMITTING COUPLING

RELATED APPLICATIONS

This application is a continuation-in-part of Ser. No. 10/043,423, filed on Jan. 10, 2002 and entitled "Drive Shaft Coupling", which in turn claims priority from the provisional application Ser. No. 60/262,362 of that title filed on Jan. 19, 2001. Priority is also claimed from provisional application Ser. No. 60/338,718, filed Nov. 6, 2001 and entitled "Tool Bit Drive Shaft Connection and Method", the entire disclosure of which is expressly incorporated by reference herein and relied-upon, as is Ser. No. 10/055,806, filed Jan. 22, 2002.

TECHNICAL FIELD

This invention generally relates to torque-transmitting coupling assemblies useful with flexible shafts made of super-elastic alloy, which are particularly beneficial in surgical instrumentation, e.g., flexible reaming systems.

BACKGROUND OF THE INVENTION

Torque has been traditionally transmitted across non-concentric axes via universal joints. Some have used drive shafts of a coiled spring construction that bend while transmitting torque along a desired path, to ameliorate the surrounding impact of protrusions from such joints. These connections have proven undesirable, particularly in surgical operations. For blood and other organic matter trapped in the assembly cannot easily be cleaned due to the intricate, non-exposed surfaces that are largely inaccessible. Moreover, aspects of universal joints can move against the tissue of a patient to cause a deleterious effect.

One approach has been to utilize flexible tubular shafts made of a super-elastic alloy such as nickel-titanium (e.g., Nitinol) to transmit torque, which has met with some success. Using a tube to transmit torque generally minimizes unexposed surfaces and allows easier cleaning, as there are no surfaces extending beyond the torque transmission tube. Universal joints instead protrude beyond the envelope of the drive shaft. Thus, the use of elastic tubes made of super-elastic alloy in, e.g., surgical devices substantially reduces the possibility of harm or discomfort to a patient.

Unfortunately, prior art devices have coupled tools and other components to a Nitinol tube in such as way as to cause stress risers and notch stresses that increase the possibility of harm to the patient. In the event such stresses cause the tube connection to break, the damage to bone and other body tissue is often catastrophic.

Although others have designed systems that seek to avoid stress risers or notch stresses, these approaches have not resulted in devices that transmit sufficient torque for many orthopedic operations.

Therefore, what is needed is a device that connects to an elastic tube in a manner that does not create stress risers. More specifically, what is needed is a reliable means of connecting various types of tool heads to an elastic tube such that significant torque may be transmitted without raising internal stresses to dangerous levels.

SUMMARY OF THE INVENTION

According to the invention, a torque-transmitting assembly is described. A female coupling member defines a shape with a tapered bore. A radially flexible sleeve member has a wall with a tapered exterior surface, received within the bore, and an inner surface defining a through-bore. An elongated shaft member made of super-elastic alloy has an outer surface that is received within the through-bore. Relative motion among at least two of the members causes the inner surface to contact the outer surface, inducing a super-elastic activation in the shaft, simultaneously securing the members together in a fixed relative position. Preferably, the relative motion is axial, with respect to a longitudinal axis around which torque is being transmitted through the fixed assembly.

In one or more preferred embodiments of the invention, the contact established is a surface-to-surface contact that frictionally transmits an applied torque.

In another preferred embodiment of the invention, the female coupling member may be adapted for connection with a powered driving instrument or may be a fitting adapted to present a tool-bit. Similarly, the radially flexible sleeve may be adapted for connection with a powered driving instrument or may be a fitting adapted to present a tool bit.

In yet another preferred embodiment of the invention, the radially flexible sleeve member has a plurality of collet fingers, which preferably contact the shaft at discrete locations. It is further preferred that the super-elastic activation in the shaft occurs as a result of the discrete contact thereby changing the cross-sectional shape of the shaft, which is generally non-circular, e.g., polygonal, in a further preferred form. In still another preferred embodiment of the invention, the through bore of the radially flexible sleeve member has a generally non-circular, e.g., polygonal cross-section. Alone or in combination with the immediately aforesaid feature, the shaft may be generally cylindrical and deformed, e.g., polygonally, by compression against the through-bore.

In still another preferred embodiment, the shaft has a tubular shape defining a cannulation. More preferably, the tapered bore of the female coupling member, the through-bore of the sleeve member and the cannulation of the shaft member are concentrically aligned with respect to a longitudinal axis around which torque is transmitted through the fixed assembly, further admitting passage of a guide wire through the members.

In one of its aspects, a torque-transmitting assembly of the present invention has a female coupling member defining a shape with a tapered bore and a radially flexible sleeve member having a tapered exterior surface, received within the bore. The sleeve has an inner surface defining a through-bore and a plurality of collet fingers. An elongated tubular shaft member has a cannulated structure and is made of super-elastic alloy, defining an outer surface that is received within the through-bore. Relative axial motion among at least two of the members causes the collet fingers to contact the shaft at discrete locations inducing a super-elastic activation in the shaft that changes the cross-sectional shape of the shaft, simultaneously securing the members together in a fixed relative position by surface-to-surface contact that transmits torque through the assembly. Preferably, the tapered bore of the female coupling member, the through-bore of the sleeve and the cannulation of the shaft are concentrically aligned with respect to a longitudinal axis around which torque is transmitted through the fixed assembly, further admitting passage of a guide wire through the members. In a preferred form, the shaft is generally cylindrical and is deformed polygonally by compression against the through-bore.

In another of its aspects, a surgical device of the present invention includes a torque transmitting coupling assembly, which has a female coupling member defining a shape with a tapered bore and a radially flexible sleeve member having a tapered exterior surface, received within the bore. The sleeve has an inner surface defining a through-bore and a plurality of collet fingers. An elongated shaft member made of super-elastic alloy has an outer surface that is received within the through-bore. Relative axial motion among at least two of the members causes the inner surface to engage the outer surface, inducing a super-elastic activation in the shaft, simultaneously securing the members together in a surface-to-surface contact that frictionally transmits an applied torque around a longitudinal axis of the assembly, securing the members together in fixed relative position. The through bore of the radially flexible member preferably has a generally polygonal cross-section. The female coupling member may be adapted for connection with a powered driving instrument or it may be a fitting adapted to present a tool-bit. Preferably, the tapered bore of the female coupling member, the through-bore of the sleeve and the cannulation of the shaft are concentrically aligned with respect to a longitudinal axis around which torque is transmitted through the fixed assembly, further admitting passage of a guide wire through the members.

In yet another of its aspects, a flexible surgical reamer of the invention is described, including an elongated tubular shaft made of super-elastic alloy and defining an outer surface with a cannulated passageway extending along a first axis, the shaft having a driven end and a driving end opposite the driven end. The reamer has a first coupling assembly that includes a drive fitting located at the driven end, defining a shape with a first tapered first bore, also a radially flexible sleeve having a wall with a tapered exterior surface, received within the bore. The sleeve has an inner surface defining a through-bore and a plurality of collet fingers. Relative motion among at least two of the shaft, fitting and sleeve causes the through bore to contact the shaft, inducing a super-elastic activation in the shaft, simultaneously securing the shaft, fitting and sleeve together in fixed relative position. The reamer has a second coupling assembly that includes a fitting defining a shape with a second tapered bore. A tool-bit has a second axis and presents a first mating interface surface. A tool has a tool axis and presents a second mating interface surface adapted for receptive complemental facing with the first mating interface surface. A deformable tongue made of super-elastic alloy, is located adjacent the driving end, and is preferably formed from the shaft. Relative motion between the tool-bit and tool slides the first and second mating interface surfaces sideways into juxtaposition, with the first, second and tool axes aligned with one another.

An advantage of the present invention is a coupling assembly for an elastic tube that transmits torque without creating stress risers. More specifically, there is provided a reliable means of connecting various types of tool heads to an elastic tube such that significant torque may be transmitted without raising internal stresses to dangerous levels. Such an advantage is particularly beneficial in surgical devices that require relatively high torque-transmission, while demanding the utmost safety in operation, e.g., flexible-reaming systems.

Another advantage is the ready assembling and disassembling of the present couplings, due to the properties of the preferred nitinol alloy.

Other objects and advantages will become apparent to those skilled in the art, upon reviewing the Figures of the Drawings, in conjunction with the Detailed Description set forth further below, wherein references to numerals corresponds to like references in the Drawings.

BRIEF DESCRIPTION OF THE DRAWINGS

FIG. 3 is a longitudinal sectional view showing another embodiment of the present invention, in an assembled state;

FIG. 4 is a cross sectional view of yet another, alternative embodiment of the invention, taken similarly to FIGS. 3A and 3B after assembly, showing a cloverleaf-shaped deformation of the tubular member;

FIGS. 5–9 are sequential views showing a surgical reamer with two coupling assemblies, according to an aspect of the present invention, with a coupling located at a respective end of the tubular member;

FIG. 9A is a cross-section taken at lines 9A—9A of FIG. 9 showing reamer in an assembled state.

FIG. 10 is an enlarged elevational view of the preferred integral tongue shown by the encircled area of FIG. 1;

FIG. 10A is an end view of FIG. 10;

FIG. 10B is an elevational view further showing the construction of the preferred integral tongue of FIGS. 10A–B;

FIG. 11 is an enlarged view of the encircled region 11 of FIG. 1;

FIG. 12 is an enlarged view of the encircled region 12 of FIG. 8; and

FIG. 13 is an enlarged exploded view of the reamer shown in FIG. 5.

DETAILED DESCRIPTION

Figure 1:
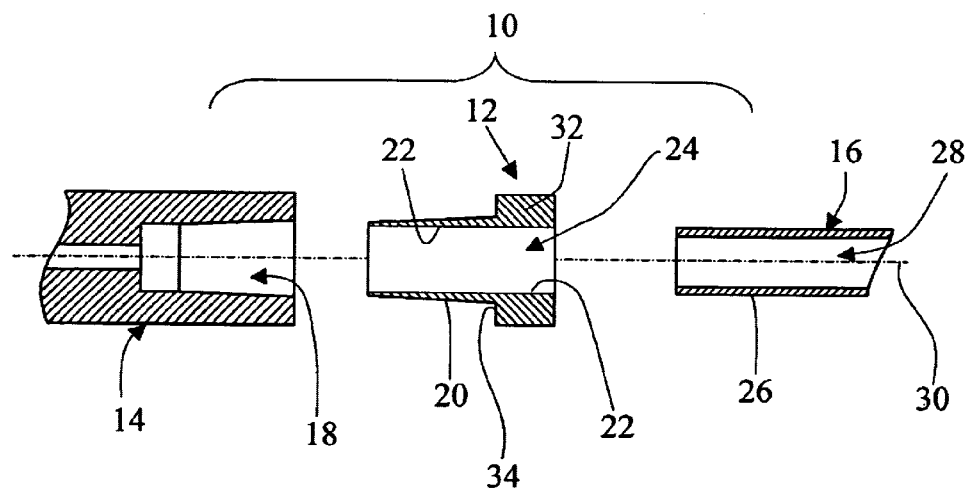
FIG. 1 is an exploded, sectional view of a torque-transmitting coupling according to an embodiment of the present invention, shown prior to assembly.
Figure 2:
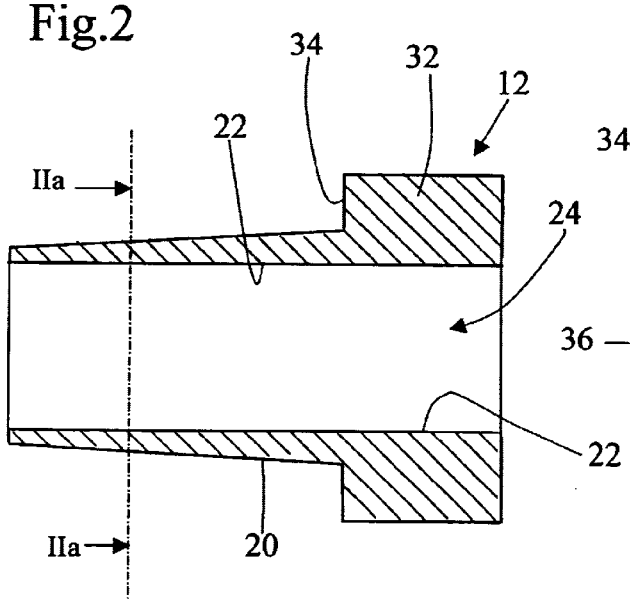
FIG. 2 is an enlarged view of a preferred sleeve member of the present coupling as depicted in FIG. 1.
Figure 2A:
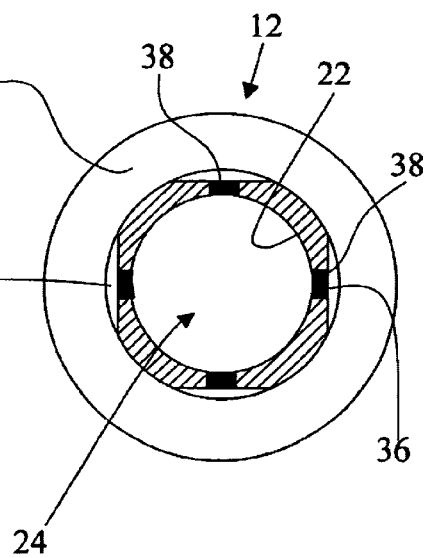
FIG. 2A is a cross sectional view taken along lines IIA—IIA of FIG. 2A.
Figure 1A:
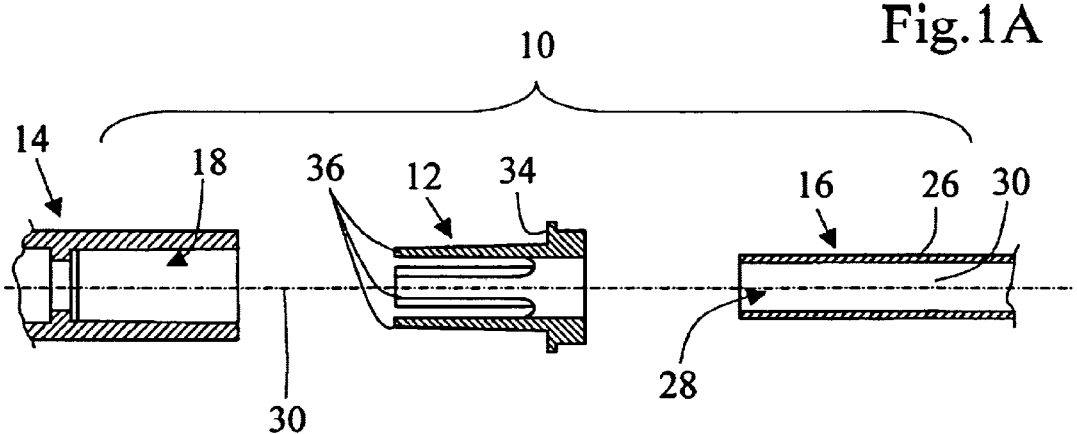
FIGS. 1A–C are sequential views, partially broken away, of the assembly of FIG. 1 further being completed.
Figure 1B:
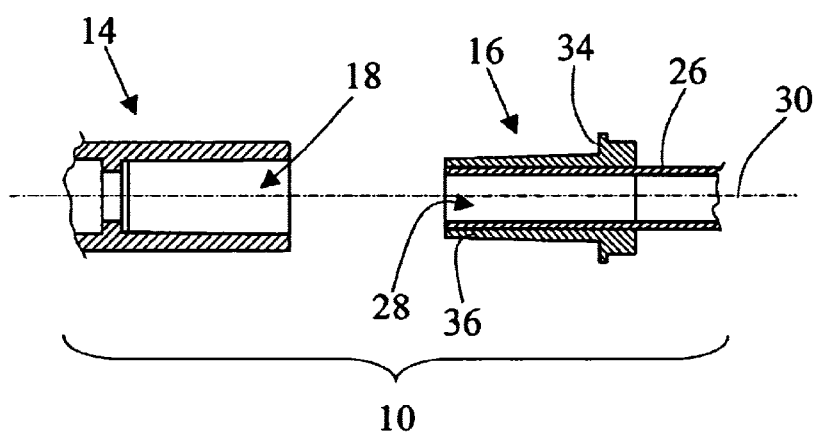
Figure 1C:
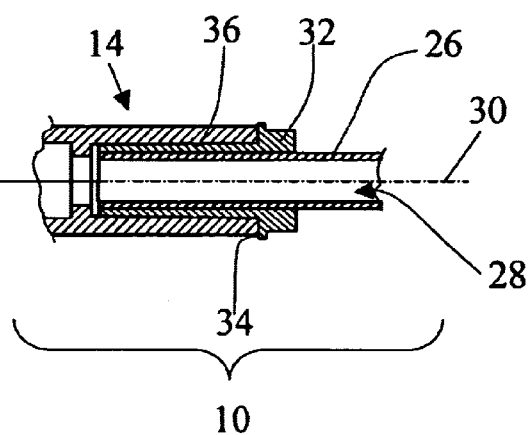

Referring to FIGS. 1–2 and 2A, there is generally shown at 10 a preferred torque-transmitting assembly of the present invention. Assembly 10 includes a radially flexible sleeve member shown at 12, a female coupling member shown at 14 and an elongated shaft member shown at 16. Female coupling member 12 defines a shape with a tapered bore indicated at 18. Sleeve 12 has a tapered exterior surface 20, received within bore 18, and an inner surface 22 defining a through-bore indicated at 24. Shaft 16 is made of a super-elastic alloy, e.g., nickel-titanium (commonly known as Nitinol), having an outer surface 26 received within through-bore 24 and being formed with a cannulation indicated at 28. Relative motion among at least two of the members 12, 14, 16 causes inner surface 22 to contact outer surface 26, inducing a super-elastic activation in shaft 16, simultaneously securing the members together in a fixed relative position. The relative motion is preferably axial, as shown for example by sequential FIGS. 1A–C, with respect to a longitudinal axis 30 around which torque is being transmitted through the fixed assembly (FIG. 1C).

Figure 3A:
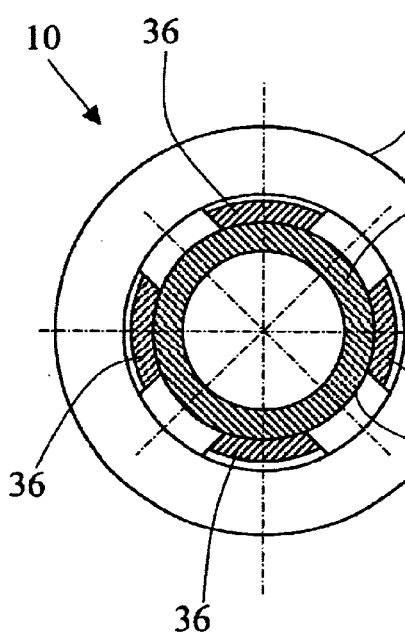
FIG. 3A is a cross sectional view taken along lines IIIA—IIIA of FIG. 3, before assembly.
Figure 3B:
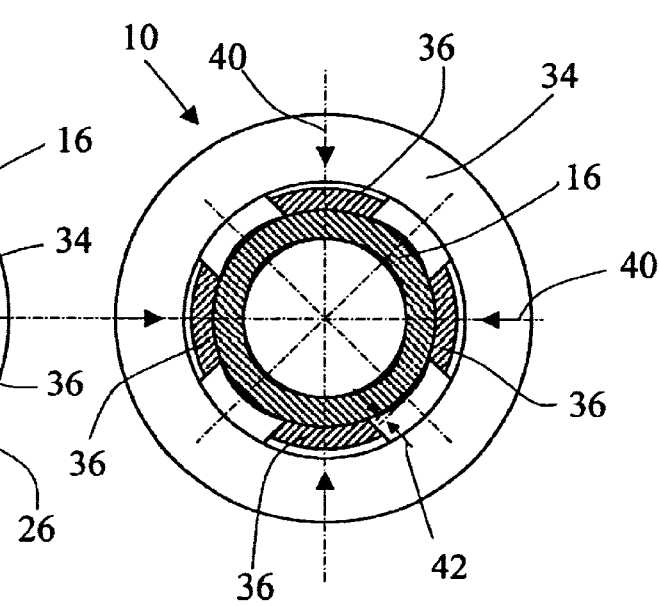
FIG. 3B is a sequential view, taken similarly along lines IIIB—IIIB of FIG. 3 but after assembly, showing polygonal deformation of the tubular member according to the invention.

Referring to FIGS. 1A–C, 2A and 3A–B, the radial flexibility of sleeve 12 is imparted by its structure, which preferably includes an annular base portion 32 with shoulder 34 and a plurality of collet fingers 36 separated by splits 38 allowing flexure of the fingers. Preferably, an array of four fingers 36 are provided that exert orthogonal radial forces indicated by arrows 40 in FIG. 3B, resulting in a distortion of tubular shaft 16 from a cylindrical shape in FIG. 3A to a more polygonal shape as indicated, e.g., by the arrows 42. As shown in FIG. 2A, fingers 36 may have flats 44 to minimize contact with the shaft (not shown) except where deformational forces are desired to be exerted. Alternatively, the fingers 36 could be curved as shown in FIGS. 3A–3B. Deformation of shaft 16 restricts the sliding of the shaft in the fixed assembly 10 as it is transmitting torque.

The afore-mentioned contact may be established in a surface-to-surface manner that serves to frictionally transmit an applied torque generated about axis 30. Nitinol has the advantage of deforming under compression to establish an area of contact, rather than a line of contact as in conventional press-fit or tapered junctions. This may be further accomplished in a selective manner by appropriate adaptation of the fingers 36 while using a standard cylindrical shaft 16 as shown in the numerous embodiments presently being depicted and suggested.

In a later described aspect of the invention embodied by a surgical reamer shown generally at 200 in FIG. 13, the female coupling member 114 is adapted for connection with a powered driving instrument (arrow 146), receiving the split collet sleeve 112 to connect and drive the shaft 116 in torque-transmitting assembly 110. Alternatively or in combination, another fitting generally indicated at 214 may be adapted to present a tool-bit generally indicated at 215 driven by shaft 116 in torque-transmitting assembly 210.

The preferred construction of tool-bit 215 is shown in FIGS. 11–13, meanwhile, FIGS. 10A–C depict a tongue 248 formed on shaft 116 that is received within tool-bit 215 as further shown by FIG. 9A in the fixed assembly 210. Fitting 214 is positioned to allow tongue 248 to extend axially within tool bit 215 (FIG. 6). The radially flexible sleeve 212 extends axially into fitting 214 and presents tool bit 215. FIGS. 10 and 10A–B illustrate the formation of tongue 248 in shaft 16, which in turn allows the shaft to be detained via the tongue within a recess 250 formed in tool-bit 215 (FIGS. 11–12).

Returning to FIGS. 1–3 and associated views, the radially flexible sleeve member 12 has a plurality of collet fingers 36, which preferably contact shaft 16 at discrete locations. It is further preferred that the super-elastic activation in shaft 16 occurs as a result of the discrete contact thereby changing the cross-sectional shape of the shaft from a circular to a generally noncircular, e.g., polygonal shape (FIGS. 3A–B). In still another preferred embodiment of the invention, through bore 24 of radially flexible sleeve member 12 has a generally non-circular, e.g., polygonal cross-section. As a result shaft 16 is deformed, e.g., polygonally, by compression against through-bore 24.

More preferably, tapered bore 18 of female coupling member 14, through-bore 24 of sleeve member 12 and cannulation 28 of shaft member 16 are concentrically aligned with respect to longitudinal axis 30 around which torque is transmitted through the fixed assembly 10, further admitting passage of a guide wire (not shown) through the members.

Referring again to FIGS. 1–3 and associated views, a torque-transmitting assembly 10 of the present invention has a female coupling member 14 defining a shape with a tapered bore 18 and has a radially flexible sleeve member 12 having a tapered exterior surface 20, received within the bore. Sleeve 12 has an inner surface defining a through-bore 24 and has a plurality of collet fingers 36. An elongated tubular shaft member 16 has a cannulation 28 and is made of super-elastic alloy, defining an outer surface 26 that is received within through-bore 24. Relative axial motion among at least two of the members 12, 14, 16 causes collet fingers 36 to contact the shaft at discrete locations, inducing a super-elastic activation in the shaft that changes its cross-sectional shape and simultaneously secures the members together in a fixed relative position by surface-to-surface contact that transmits torque through the assembly 10. FIG. 1A shows shaft 16 moved axially into sleeve 12 prior to introduction within bore 18 to complete the fixed assembly 10. Preferably, tapered bore 18 of female coupling member 14, through-bore 24 of sleeve 12 and cannulation 28 in shaft 16 are concentrically aligned with respect to a longitudinal axis 30 around which torque is transmitted through the fixed assembly 10, further admitting passage of a guide wire (not shown) through the members. In a preferred form, shaft 16 is generally cylindrical then is deformed polygonally by compression against through-bore 24.

FIG. 4 shows an alternative form of the assembly 10, with sleeve 12 having a clover-leaf structure that imparts a corresponding deformation of shaft 16. The sleeve is a collet with splits 38.

In another of its aspects, a surgical device of the present invention is generally shown at 200 in FIGS. 5–13. Device 200 includes a torque transmitting coupling assembly 110, which has a female coupling member 114 defining a shape with a tapered bore 118 and a radially flexible sleeve member 112 having a tapered exterior surface 120, received within the bore. Sleeve 112 has an inner surface 122 defining a through-bore 124 and a plurality of collet fingers 136. An elongated shaft member 116 made of super-elastic alloy has an outer surface 126 that is received within through-bore 124. Relative axial motion among at least two of the members 112, 114, 116 causes inner surface 122 to engage outer surface 126, inducing a super-elastic activation in shaft 116, simultaneously securing the members together in a surface-to-surface contact that frictionally transmits an applied torque around a longitudinal axis 130 of the assembly 110, securing the members together in fixed relative position. Through-bore 124 of the radially flexible member 112 preferably has a generally polygonal cross-section, as described above in relation to FIGS. 1–3. The female coupling member 114 may be adapted for connection with a powered driving instrument (arrow 146) or it may be a fitting 214 adapted to present a tool-bit 215. Preferably, the tapered bore 118 of female coupling member 114, through-bore 124 of sleeve member 112 and cannulation 128 of shaft member 116 are concentrically aligned with respect to a longitudinal axis 230 around which torque is transmitted through the fixed assembly 210, further admitting passage of a guide wire (not shown) through the members.

In yet another of its aspects, a flexible surgical reamer of the invention is generally depicted at 200 in FIGS. 5–13. Reamer 200 includes an elongated tubular shaft 116 made of super-elastic alloy and defining an outer surface 126 with a cannulated passageway 128 extending along a first axis 130a. Shaft 116 is driven by a first torque-transmitting coupling assembly 110 connected to a drive source 146 and, in turn, drives another torque-transmitting assembly 210 having a tool-bit 215. Assembly 110 includes a drive fitting 114 at its driven end, defining a shape with a first tapered bore 118, also a radially flexible sleeve 112 having a tapered exterior surface 120, received within the first bore 118.

Sleeve 112 has an inner surface 122 defining a through-bore 124 and a plurality of collet fingers 136. Relative motion among at least two of the shaft 116, fitting 114 and sleeve 112 causes through-bore 124 to contact shaft 116, inducing a super-elastic activation in the shaft, simultaneously securing the shaft, fitting and sleeve together in fixed relative position. Reamer 200 has a second coupling assembly 210 that includes a fitting 214 defining a shape with a tapered bore 218, a tool-bit 215 having a radially flexible portion vis-a-vis collet fingers 236 and a second axis 230, presenting a first mating interface surface 252. A tool (not shown herein), is of the type described in Applicant's incorporated parent application, having a tool axis 256 and presenting a second mating interface surface 258 adapted for receptive complemental facing with first mating interface surface 252, (see Case 28NP and its prior provisional application Ser. No. 60/338/718). A deformable tongue 248 made of super-elastic alloy, is located adjacent the driving end, preferably formed from the driving end of shaft 116 (FIGS. 10–14). Relative motion between tool-bit 215 and the tool slides the first 252 and second 258 mating interface surfaces sideways into juxtaposition with the first, second and tool axes aligned with one another.

The present invention therefore provides an advantageous coupling assembly 110, 210 for an elastic tube 16, 116 that transmits torque without creating stress risers. More specifically, there is provided a reliable means of connecting various types of tool heads 215 to an elastic tube 16, 116 such that significant torque may be transmitted without raising internal stresses to dangerous levels. Such an advantage is particularly beneficial in surgical devices, such as the reamer 200 that require relatively high torque-transmission, while demanding the utmost safety in operation, e.g., flexible-reaming systems.

The non-cylindrical/non-conical forms employed by the inventive assembly 110, 210 can be created using a number of known processes. For example, these forms can be machined on a milling machine or an Electronic Discharge Milling ("EDM") machine. These forms can also be molded using investment casting and die molding techniques as well as a number of other methods.

Multiple variations and modifications are possible in the embodiments of the invention described here. Although certain illustrative embodiments of the invention are shown and described here, a wide range of modifications, changes, and substitutions is contemplated in the foregoing disclosure. In some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

What is claimed is:

1. A torque-transmitting assembly comprising:
   a female coupling member defining a shape with a tapered bore;
   a radially flexible sleeve member having a wall with a tapered exterior surface, received within the bore, and an inner surface defining a through-bore; and
   an elongated shaft member made of super-elastic alloy and having an outer surface, received within the through-bore,
   whereupon relative motion among at least two of the members causes the inner surface to contact the outer surface, inducing a super-elastic activation in the shaft, simultaneously securing the members together in a fixed relative position.

2. The assembly of claim 1 wherein the contact further comprises a surface-to-surface contact that frictionally transmits an applied torque.

3. The assembly of claim 1 wherein the radially flexible sleeve member has a plurality of collet fingers.

4. The assembly of claim 3 wherein the collet fingers contact the shaft at discrete locations.

5. The assembly of claim 4 wherein the super-elastic activation in the shaft occurs as a result of the discrete contact thereby changing the cross-sectional shape of the shaft.

6. The assembly of claim 5 wherein the resultant cross-sectional shape of the shaft is generally non-circular.

7. The assembly of claim 6 wherein the resultant shape of the shaft is generally polygonal.

8. The assembly of claim 1 wherein the through bore of the radially flexible member has a generally non-circular cross-section.

9. The assembly of claim 8 wherein the through bore has a generally polygonal cross-section.

10. The assembly of claim 1 wherein the female coupling member is either adapted for connection with a powered driving instrument or is a fitting adapted to present a tool-bit.

11. The assembly of claim 1 wherein the radially flexible sleeve is either adapted for connection with a powered driving instrument or comprises a fitting adapted to present a tool bit.

12. The assembly of claim 1 wherein the shaft is generally cylindrical and is deformed polygonally by compression against the through-bore.

13. The assembly of claim 1 wherein the relative motion is axial, with respect to a longitudinal axis around which torque is being transmitted through the fixed assembly.

14. The assembly of claim 1 wherein the shaft has a tubular shape defining a cannulation.

15. The assembly of claim 14 wherein the tapered bore of the female coupling member, the through-bore of the sleeve and the cannulation of the shaft are concentrically aligned with respect to a longitudinal axis around which torque is transmitted through the fixed assembly, further admitting passage of a guide wire there-through.

16. A torque-transmitting assembly comprising:
   a female coupling member defining a shape with a tapered bore;
   a radially flexible sleeve member having a wall with a tapered exterior surface, received within the bore, an inner surface defining a through-bore, and a plurality of collet fingers; and
   an elongated tubular shaft member defining a cannulation, being made of super-elastic alloy, having an outer surface received within the through-bore,
   whereupon relative axial motion among at least two of the members causes the collet fingers to contact the shaft at discrete locations inducing a super-elastic activation in the shaft that changes the cross-sectional shape of the shaft, simultaneously securing the members together in a fixed relative position by surface-to-surface contact that transmits torque through the assembly.

17. The assembly of claim 16 wherein the tapered bore of the female coupling member, the through-bore of the sleeve and the cannulation of the shaft are concentrically aligned with respect to a longitudinal axis around which torque is transmitted through the fixed assembly, further admitting passage of a guide wire there-through.

18. The assembly of claim 16 wherein the shaft is generally cylindrical and is deformed polygonally by compression against the through-bore.

19. A surgical device including a torque transmitting coupling assembly and comprising:
- a female coupling member defining a shape with a tapered bore;
- a radially flexible sleeve member having a wall with a tapered exterior surface, received within the bore, an inner surface defining a through-bore and a plurality of collet fingers; and
- an elongated shaft member made of super-elastic alloy and having an outer surface, received within the through-bore,
- whereupon relative axial motion among at least two of the members causes the inner surface to engage the outer surface, inducing a super-elastic activation in the shaft, simultaneously securing the members together in a surface-to-surface contact that frictionally transmits an applied torque around a longitudinal axis of the assembly, securing the members together in fixed relative position.

20. The device of claim 19 wherein the through bore of the radially flexible member has a generally polygonal cross-section.

21. The device of claim 19 wherein the female coupling member is either adapted for connection with a powered driving instrument or is a fitting adapted to present a tool-bit.

22. The device of claim 19 wherein the tapered bore of the female coupling member, the through-bore of the sleeve member and the cannulation of the shaft member are concentrically aligned with respect to a longitudinal axis around which torque is transmitted through the fixed assembly, further admitting passage of a guide wire through the members.

23. A flexible surgical reamer comprising:
a) an elongated tubular shaft made of super-elastic alloy, defining an outer surface and a passageway extending along a first axis, with a driven end and a driving end opposite the driven end;
b) a first coupling assembly that includes
  (i) a drive fitting located at the driven end, defining a shape with a first tapered bore,
  (ii) a radially flexible sleeve having a wall with a tapered exterior surface, received within the first bore, an inner surface defining a through-bore and a plurality of collet fingers,
  (iii) whereupon relative motion among at least two of the shaft, fitting and sleeve causes the through bore to contact the shaft, inducing a super-elastic activation in the shaft, simultaneously securing the shaft, fitting and sleeve together in fixed relative position; and
c) a second coupling assembly that includes
  (i) a fitting defining a shape with a second tapered bore,
  (ii) a tool-bit having a second axis and a radially flexible sleeve portion received in the second bore, the tool-bit presenting a first mating interface surface
  (iii) a tool having a tool axis and presenting a second mating interface surface and
  (iv) a deformable tongue made of super-elastic alloy, located adjacent the driving end, for detentively retaining the tool-bit on the shaft
  (v) whereupon relative motion between the tool-bit and tool slides the first and second mating interface surfaces sideways into juxtaposition with the first, second and tool axes aligned with one another.

* * * * *